United States Patent [19]
Beasley

[11] Patent Number: 5,634,191
[45] Date of Patent: May 27, 1997

[54] SELF-ADJUSTING RF REPEATER ARRANGEMENTS FOR WIRELESS TELEPHONE SYSTEMS

[75] Inventor: Andrew Beasley, Vancouver, Canada

[73] Assignee: PCS Microcell International, Inc., Bridgetown, Barbados

[21] Appl. No.: 327,746

[22] Filed: Oct. 24, 1994

[51] Int. Cl.⁶ .................................................. H04B 3/36
[52] U.S. Cl. ..................... 455/14; 455/54.1; 455/237.1; 455/245.1; 455/21
[58] Field of Search ................ 455/11.1, 14, 15, 455/19, 21, 24, 54.1, 55.1, 84, 126, 127, 232.1, 234.1, 234.2, 235.1, 237.1, 245.1, 249.1, 33.1

[56] References Cited

U.S. PATENT DOCUMENTS

| 3,146,397 | 8/1964 | Broadhead | 455/84 |
|---|---|---|---|
| 4,563,775 | 1/1986 | Yokosuka | 455/126 |
| 5,095,528 | 3/1992 | Leslie et al. | |
| 5,187,803 | 2/1993 | Sohner et al. | 455/14 |
| 5,321,736 | 6/1994 | Beasley | 455/15 |
| 5,321,849 | 6/1994 | Lemson | 455/249.1 |

FOREIGN PATENT DOCUMENTS

| 0599659 | 11/1993 | European Pat. Off. |
| 0605182 | 12/1993 | European Pat. Off. |
| 3126195 | 7/1981 | Germany |
| 3283724 | 3/1990 | Japan |

*Primary Examiner*—Reinhard J. Eisenzopf
*Assistant Examiner*—Nguyen Vo
*Attorney, Agent, or Firm*—Graham & James LLP

[57] ABSTRACT

An RF repeater arrangement for exchanging transmit and receive signals between a handset and a base station in a wireless telephone system automatically compensates for attenuation losses. The RF repeater arrangement includes first and second RF repeater parts connected by a signal conduit, the first part interfacing with the base station and having a signal level detector for detecting the level of the transmit signal, a microprocessor controller for quantizing and encoding the signal level detected by the level detector and a modulator for modulating the signal level data and outputting the modulated signal level data to the signal conduit. The second part has a demodulator for demodulating the signal level data, an amplifier for amplifying the transmit signal, a signal level detector for detecting the level of the transmit signal amplified by the amplifier, and a microprocessor controller for comparing the demodulated signal level data and the amplified signal level and correspondingly adjusting the amplifier to counteract attenuation of the transmit signal and the receive signal along the signal conduit.

12 Claims, 5 Drawing Sheets

SELF-ADJUSTING RF REPEATER ARRANGEMENTS FOR WIRELESS TELEPHONE SYSTEMS

BACKGROUND OF THE INVENTION

1. Field of the Invention

The present invention relates to RF repeater arrangements for use in wireless telephone systems and, more particularly, for linking base stations to mobile wireless handsets in such systems, and is applicable to Time Division Duplex (TDD) signals and to Frequency Division Duplex (FDD) signals.

The invention may be used in wireless telephone systems using a signal conduit (e.g. co-axial cable, fibre optic cable, microwave links, infra-red links, cable TV plant or a combination of two or more thereof) to link a number of RF repeater elements, e.g. microcell extenders to a base station.

2. Description of Related Art

Base stations are employed to interface public switched telephone networks to RF signals, i.e. base stations transmit and receive RF signals to and from wireless telephony networks. Typically, a base station can support a number of simultaneous voice links.

Such base stations have RF signal transmitting and receiving equipment and control equipment and can be connected through a coaxial cable or other signal conduit to one or more RF repeaters, which interface with wireless handsets, i.e. broadcast transmit signals from the base station to the wireless handsets as radio signals and also receive radio signals from the handsets and pass them to the base stations. In this way, the RF repeaters can be utilized to increase substantially the area which can be served by one base station. It is in many cases advantageous to make such an RF repeater as an arrangement of two RF repeater parts or elements, i.e. a first part or base station extender which interfaces with the base station and a second part or microcell extender which interfaces with the handsets. These two parts may be physically separated from one another by a long distance, e.g. several kilometers, and connected by a signal conduit in the form of e.g. co-axial cable or optical fibre cable.

In practice, the second or handset part of the RF repeater arrangement is often one of a number of such handset interface parts provided at different locations and connected in common to the first or base station interface part. In this way, there is provided an RF repeater which enables a single base station to serve a number of different locations.

A problem in the present RF repeater technology is the need to provide timing and level adjustment information to the second parts of the RF repeater which takes account their unique placements in the signal conduit network. For example, if the second RF repeater part is interconnected by 100 meters of co-axial cable to the first RF repeater part, it perceives the signal level attenuated by the 100 meters of co-axial cable. However, the RF loss factor over this co-axial cable length will be quite different from that experienced by another second RF repeater part that is interconnected by 200 meters of co-axial cable. To be able to broadcast the correct signal level, it is necessary to determine and compensate for the RF loss factors unique to the respective second RF repeater parts.

This problem may be addressed in a number of different ways:

1. The gain of each second RF repeater part may be manually adjusted. This is unattractive in a large network and may be ineffective in any event since, unless the RF insertion loss is known, it is difficult to set the transmit power of the handset interface when a plurality of transmit signals are present.

Additionally, when cable TV networks are used as signal conduits, the losses of subscriber taps and splitters form a part of the overall RF losses. Since the losses associated with such equipment usually occur in the homes of the subscribers, they cannot readily be determined from outside the homes.

Also the gain required can vary as a function of time, temperature, etc.

2. Pilot signals may be added at the first RF repeater part to allow a conventional Automatic Level Control. This approach provides a general solution, but is often unwelcome since the addition of pilot signals increases the likelihood of spurious signals being broadcast from the RF repeater. This is because the pilot frequency must be close to the RF signal frequency if it is to have the same loss on the signal conduit.

In some signal conduits (e.g. cable TV networks), there are additional complications in trying to acquire an appropriate frequency band for the pilot signals.

3. The base station RF transmit signal may be employed as a pilot signal, and a conventional Automatic Level Control system may be based on this. This approach is useful in some circumstances, most notably when the RF signal conforms to a single carrier Time Division Multiple Access (TDMA) format, but is quite ineffective when used with other formats, e.g. multiple carrier TDMA or Frequency Division Multiple Access (FDMA).

4. Some RF signalling protocols (e.g. CT-2 Plus), have Control and Signalling Channels (CSCs) or similar beacons, that can be used as a level reference. Unfortunately, the CSCs were not defined for this purpose. They may become absent during a voice link, or they may change levels under adaptive power control environment in a fashion inconsistent with their use as a level reference.

In the above examples, the problem has been flamed in terms of the transmit power level. An identical problem exists in terms of the receive power level: a large array of second RF repeater parts works best if each second RF repeater has an identical receive path gain back to the base station, measured through its unique signal conduit interconnects.

BRIEF SUMMARY OF THE INVENTION

It is accordingly an object of the present invention to provide a novel and improved RF repeater arrangement for linking a base station to a wireless handset in which the transmit and receive signal levels of an RF repeater arrangement are adjusted to compensate for the RF insertion loss along a signal conduit between a handset interface part and a base station interface part of the RF repeater arrangement.

According to the present invention, there is provided an RF repeater arrangement for linking a base station and a wireless handset in a wireless telephone system, the RF repeater arrangement comprising a first RF repeater part for connection to the base station, a second RF repeater part for transmitting radio signals to, and receiving radio signals from, the wireless handset, and a signal conduit connecting the first repeater part to a the second RF repeater part.

The first RF repeater part contains a signal level detector for measuring the power associated with a transmit signal from the base station. The measurement of the RF transmit power from the base station is quantised at the first RF repeater part, and then output as data on e.g. a control channel at 10.7 MHz. used for communication between the first and second RF repeater parts. Because the control channel is not used per se as a pilot signal, it can be many octaves in frequency from the RF signals and so presents no likelihood of generating spurious emissions or other difficulties.

The base station normally has an internal level control, and so is guaranteed to provide a known output level on a per carrier basis. It is pointed out that a multicarrier TDMA base station and an FDMA base station vary the number of carriers present according to the demand for voice traffic. Thus, in such systems the net power output (i.e. the sum of the individual carrier powers), from the base station varies, making the RF signal unsuitable for use as a pilot signal. The second RF repeater part demodulates the control channel and recovers the RF level information. This level information is then compared to the output of a signal level detector situated inside the second RF repeater part. Based on the results of this comparison, a signal level regulator in the second RF repeater part is adjusted to increase the transmit signal level at the second RF repeater part to a predetermined ratio of the transmit signal level at the first RF repeater part. Although the net RF level from the base station will vary in multicarrier TDMA and in FDMA systems, the second RF repeater part thus still properly adjusts its own levels.

By using pre-programmed offsets in the second RF repeater part, the receive path gain can be derived from the transmit path gain information.

For TDD systems the transmit path gain and the receive path gain are the same for non-heterodyne signal transport over the signal conduit. Thus, the second RF repeater part can use this method of gain adjustment for both transmit and receive path gain adjustment.

For some TDD systems (e.g. CT-2 Plus, which is a TDD-FDMA technology or DECT which is a TDD-TDMA technology), the base station provides regulated bursts of RF (e.g. the CSC channels in CT-2 Plus systems or a beacon signal in the DECT system) at such a level and with such regularity that the first RF repeater part can clearly identify the bursts. In such circumstances, the transmit-receive timing can be deduced from the signal level detector used to make the level measurements at the first RF repeater part.

For TDD systems, key timing information may also be provided.

BRIEF DESCRIPTION OF THE DRAWINGS

Further objects, features and advantages of the present invention will be more readily apparent to those skilled in the art from the following description of the present invention when taken in conjunction with the accompanying drawings, in which.

DESCRIPTION OF THE PREFERRED EMBODIMENTS

Figure 1:
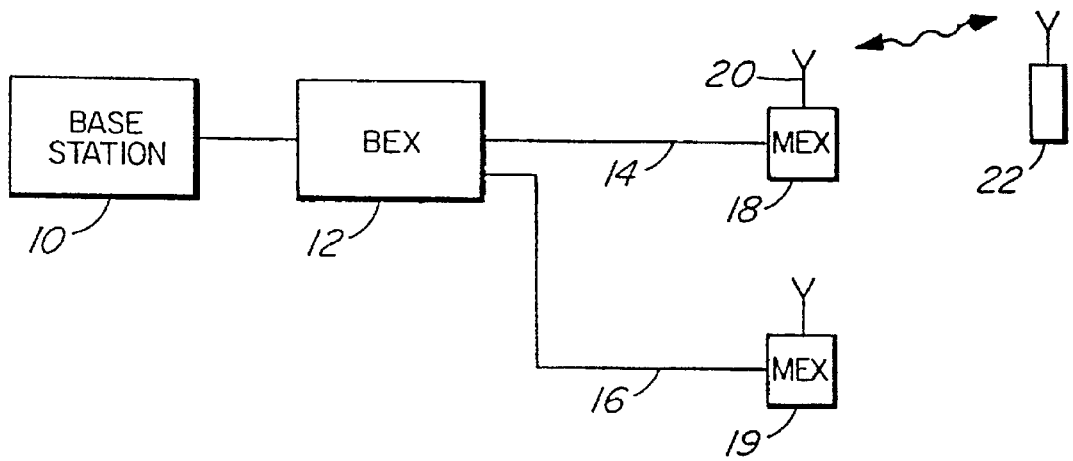
FIG. 1 shows a block diagram of a wireless telephone system.

FIG. 1 shows a telephone system which includes a base station 10 for interfacing with a public switched telephone network (not shown) and, more particularly, for receiving baseband transmit signals from the public switched telephone network and outputting them as Time Division Duplex (TDD) or Frequency Division Duplex (FDD) transmit signals, and also for converting incoming TDD or FDD receive signals into baseband signals which are applied to the public switch telephone network. Such a base station is well known in the art and, therefore, is not described in greater detail herein. The base station 10 is connected to an RF repeater arrangement which, in the present embodiment of the invention, comprises a first RF repeater part in the form of a base station extender 12 connected by signal conduits in the form of co-axial cables 14 and 16 to second RF repeater parts in the form of microcell extenders 18 and 19, which are provided with antennas 20 for exchanging the transmit and receive signals with a mobile wireless handset 22 as radio signals.

The above-described RF repeater arrangement has the advantage that only one base station 10 is required to exchange the transmit and receive signals with the handset 22, provided that the handset 22 is located within the coverage zone of one or the other of the microcell extenders 18 and 19, so that the effective range of coverage of the base station 10 is thus increased by the use of the two microcell extenders 18 and 19. As will be apparent to those skilled in the art, this telephone system is not restricted to the use of only two microcell extenders 18 and 19, but may include a plurality of microcell extenders, which may be arranged with overlapping coverage zones so as to form a roamer corridor over which the handset 22 may roam while communicating with the base station 10.

However, since the co-axial cables 14 and 16 have different lengths, the transmit signals, which are attenuated by the co-axial cables 14 and 16 as well as by the base station extender 12 and the microcell extenders 18 and 19, are subject to different attenuations, and correspondingly different signal level losses, between the base station extender 12 and the microcell extenders 18 and 19. Similar assymmetrics in attenuation losses may be increased by the addition of RF splitters to form sub-nets of microcell extenders off, say, the co-axial cable 16. Likewise, the receive signals are differently attenuated in passing from the antennas 20 to the base station 10. The present invention provides means for compensating these signal losses, as described below.

Figure 2:
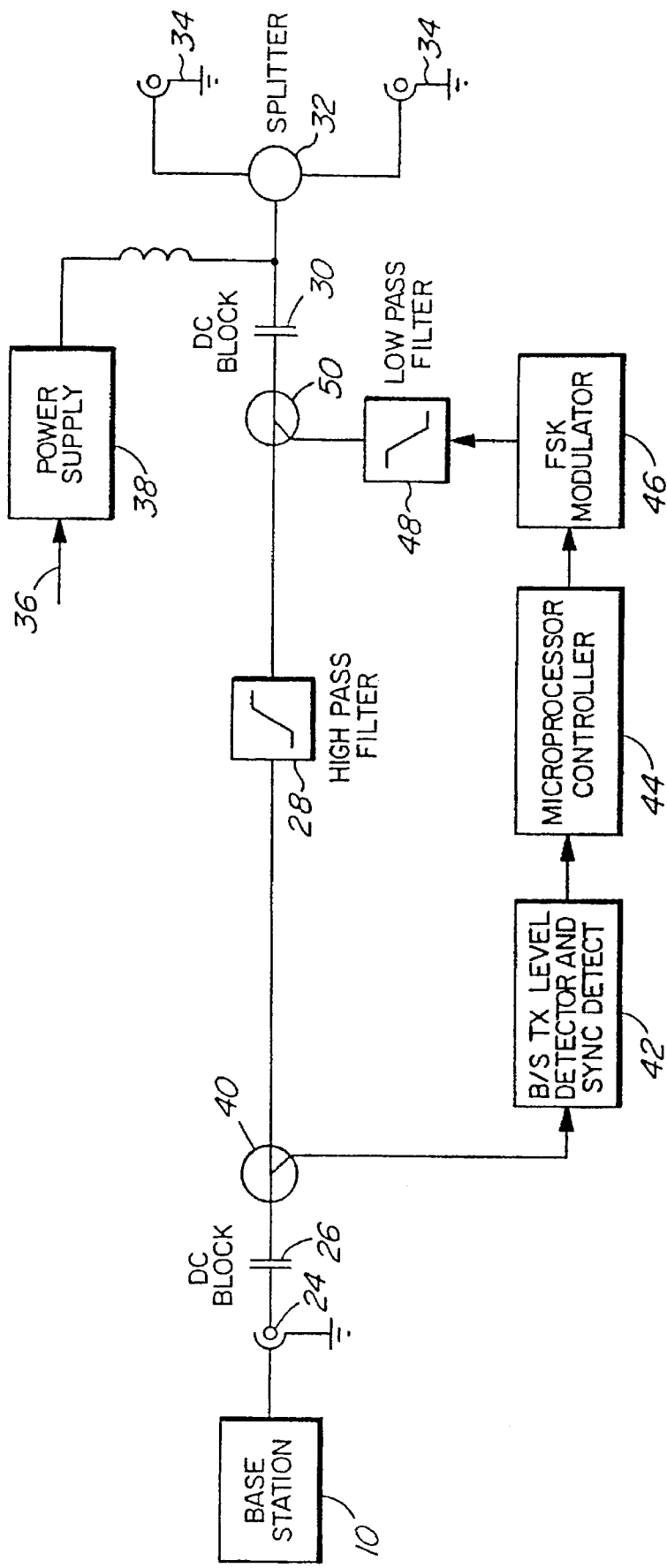
FIG. 2 shows a block diagram of a base station extender forming part of the telephone system of FIG. 1.

Referring now to FIG. 2, which illustrates the base station extender 12 in greater detail, a connector 24, which is connected to the base station 10, is connected through a DC blocking capacitor 26, a high pass filter 28 and a second DC blocking capacitor 30 to a splitter 32, which is provided with two co-axial connectors 34 for connection to the co-axial cables 14 and 16. In the case, for example, that the telephone system is implemented to operate in accordance with the CT-2 Plus standard (TDD-FDMA), the base station 10 will output the transmit signal for one millisecond at 944 MHz and will then receive the receive signal for one millisecond at 944 MHz. The transmission from the base station 10 is typically at a high signal level, e.g. 10 milliWatts, while the receive signals are typically at a low power level, e.g. 1 nanoWatt.

The basestation extender 12 also has a power input conductor 36, which is connected from an alternating current supply (not shown) to a power supply 38, which outputs DC or low frequency AC power through the splitter 32 to the central conductors of the co-axial cables 34 for powering the remote microcell extenders 18 and 19.

Between the DC blocking capacitor 26 and the high pass filter 28, there is connected a directional coupler 40, which connects a portion of the base station transmit signal to a first signal power level detector 42, which comprises a standard diode detector circuit. Whenever the base station transmits a signal for 1 millisecond, the signal level at the detector 42 produces a 1 millisecond pulse having a pulse height proportional to the magnitude of the transmit signal from the base station 10. This pulse is supplied to a microprocessor controller 44, which quantises the height of the pulse and encodes signal level data, representing the pulse height, in a data stream which is modulated, by a frequency shift keyed (FSK) modulator 46, onto a 10.7 MHz subcarder as data, as described in greater detail below. The modulated signal level data then passes through a low pass filter 48 to a directional coupler 50, connected between the high pass filter 28 and the DC blocking capacitor 30, for transmission through the co-axial cables 14 and 16 to the microcell extenders 18 and 19. In the present embodiment of the invention, the microprocessor controller 44 is implemented as a Motorola 68HC11 microprocessor with on-chip analog-to-digital converters.

It is pointed out that the directionality of the directional coupler, 40 favours pickup of transmit signals from the base station 10, and does not favour pickup of receive signals from the handset 22. This directionality, in association with the difference in magnitude of the transmit and receive signals, allows the microprocessor controller 44 to differentiate simply between the transmit signals and the receive signals. As a consequence of being able to recognize the transmit signal pulses from the receive pulses, the microprocessor controller 44 can use the level detector 42 to define the transmit/receive timing necessary for synchronization of the second RF repeater parts. This method of deriving transmit receive timing is only useful once a handset has an established signal link with a base station (i.e. there is a valid transmit pulse from the base station to detect). This method is generally not applicable in the absence of a base station-handset link.

In the absence of such a link, it is possible to use a CSC or beacon signal from the base station to provide timing. Thus, for example, in the case of the CT-2 Plus protocol, a signal in the form of a regular RF burst from the base station (the CSC) is guaranteed in the absence of a base station-handset link. Thus, for CT-2 Plus, the CSC may be used to provide full transmit-receive timing at all time epochs, when used in conjunction with timing derived during a voice link.

This transmit/receive timing is encoded into the FSK data stream by the microprocessor controller 44.

Figure 3:
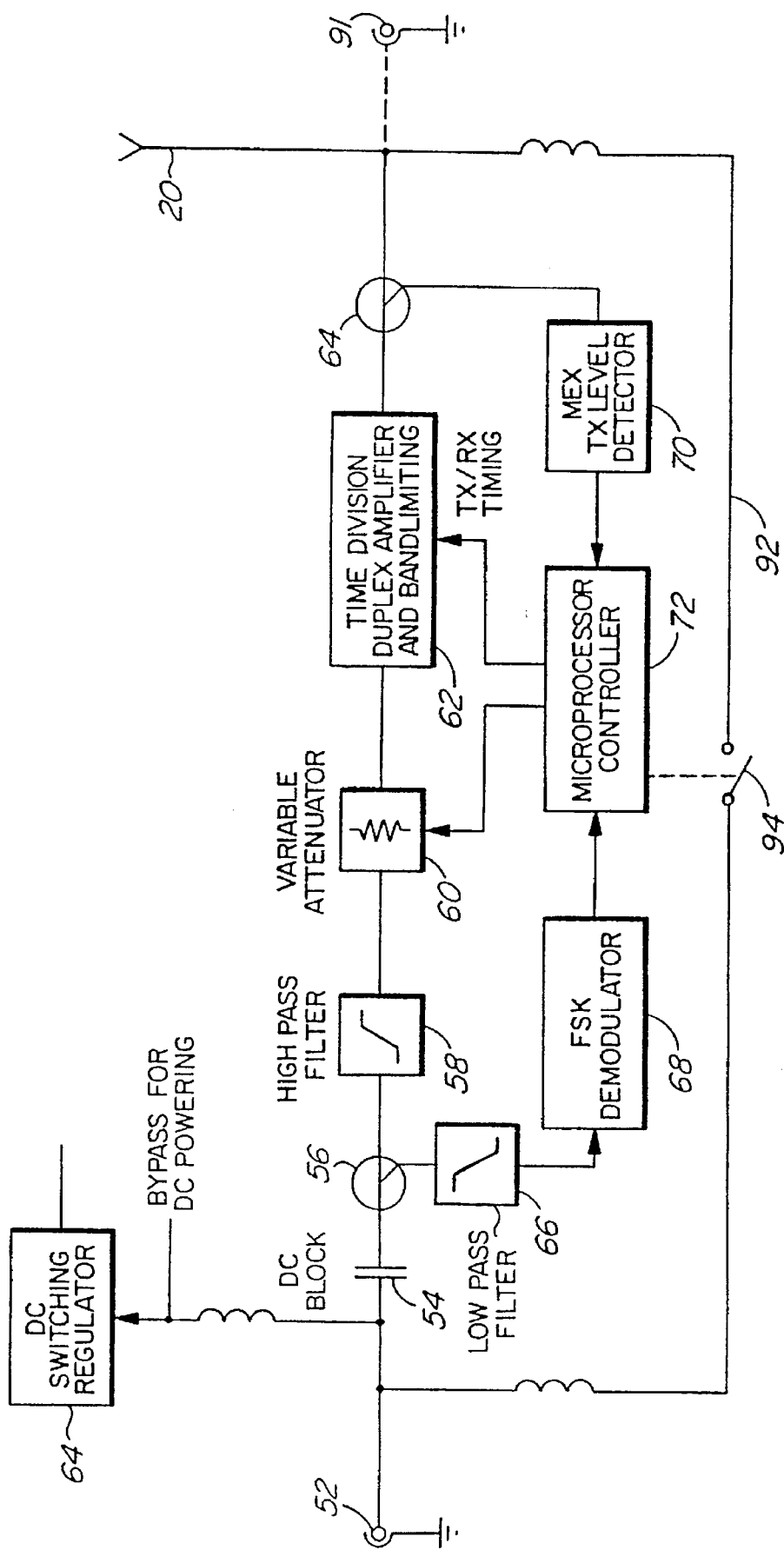
FIG. 3 shows a block diagram of a microcell extender forming part of the telephone system of FIG. 1.

The microcell extender 18 is shown in greater detail in the block diagram of FIG. 3 is intended for TDD operation using the CT-2 Plus protocol, and it is to be understood that the microcell extenders 18 and 19 are similar to one another.

As shown in FIG. 3, the microcell extender 18 has an input in the form of a co-axial connector 52 for connection to the co-axial cable 14. The co-axial connector 52 is connected through a DC blocking capacitor 54, a directional coupler 56, a high pass filter 58 and a variable attenuator 60 to the input of a band limited TDD amplifier 62. As described below, the variable attenuator 60 and the amplifier 62 form a signal level regulator for adjusting the levels of the transmit and receive signals. The output of the band limited TDD amplifier 62 is connected through a directional coupler 64 and the output of the microcell extender 18 to the antenna 20. The co-axial connector 52 is also connected to a DC switching regulator 64, the output of which provides DC power to all the electronic circuits in FIG. 3.

The directional coupler 56 supplies a portion of the incoming signal, from the co-axial cable 14, through a lowpass filter 66, to preferentially pass the 10.7 MHz signal, to a 10.7 MHz frequency shift keyed demodulator 68, the output of which contains the signal level data and the transmit-receive synchronization data provided, as described above, by the base station extender 12.

A portion of the output of the band limited TDD amplifier 62 is supplied by the directional coupler 64 to a second level detector 70, which detects the power level of the amplified transmit signal being supplied to the antenna 20 and provides this level to a control device in the form of a microprocessor controller 72.

The level detector 70 is implemented by a circuit identical to that of the level detector 42 in FIG. 2, i.e. a standard diode detector circuit. This will often result in some easing of temperature, tolerancing and linearity constraints since the use of identical level detectors 70 and 42 will typically result in these imperfections cancelling out.

The signal level data output from the demodulator 68 is compared in the microprocessor controller 72 with the quantised level from the level detector 70 to determine the difference in the levels of the transmit signal at the base station extender 12 and at the microcell extender 18 and the microprocessor controller 82 correspondingly adjusts the variable attenuator 60 so as to cause the level of the amplified transmit signal supplied to the antenna 20 to a predetermined ratio, e.g. 1:1, relative to that of the transmit signal detected by the level detector 42 of FIG. 2.

Consequently, the microcell extender 18 will adjust its output so that the signal level at the antenna 20 is e.g. substantially identical to that at the output of the base station 10. The same holds true for the transmit signal level at the antenna 20 of the microcell extender 19. The directional coupler 64 has a preference for coupling the transmit signal power to the power detector 70, and does not couple the receive signal power well.

Figure 4A:
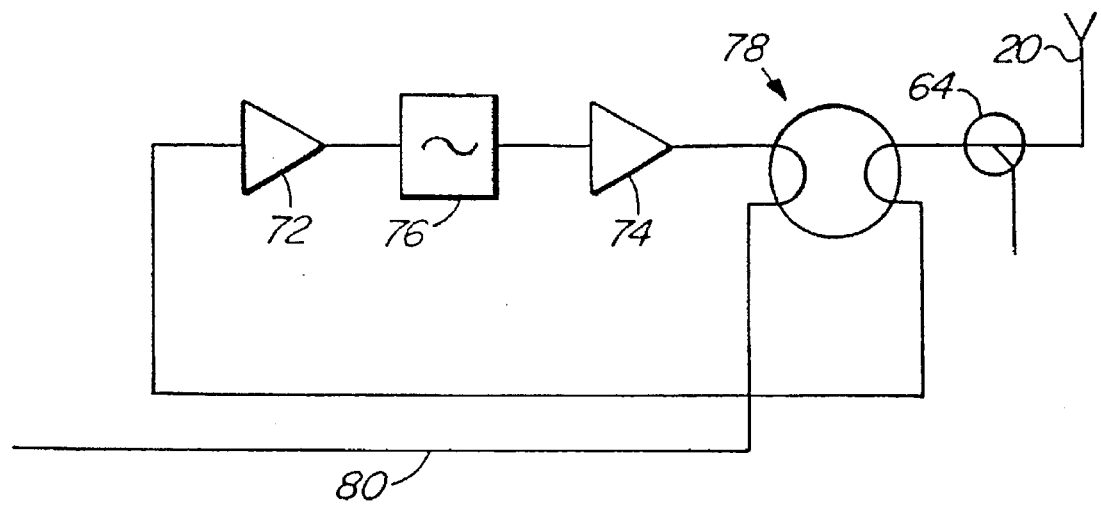
FIGS. 4a and 4b show an amplifier and switch arrangement, forming part of the microcell extender of FIG. 3 (when configured to support TDD signals) in two different switched modes.
Figure 4B:
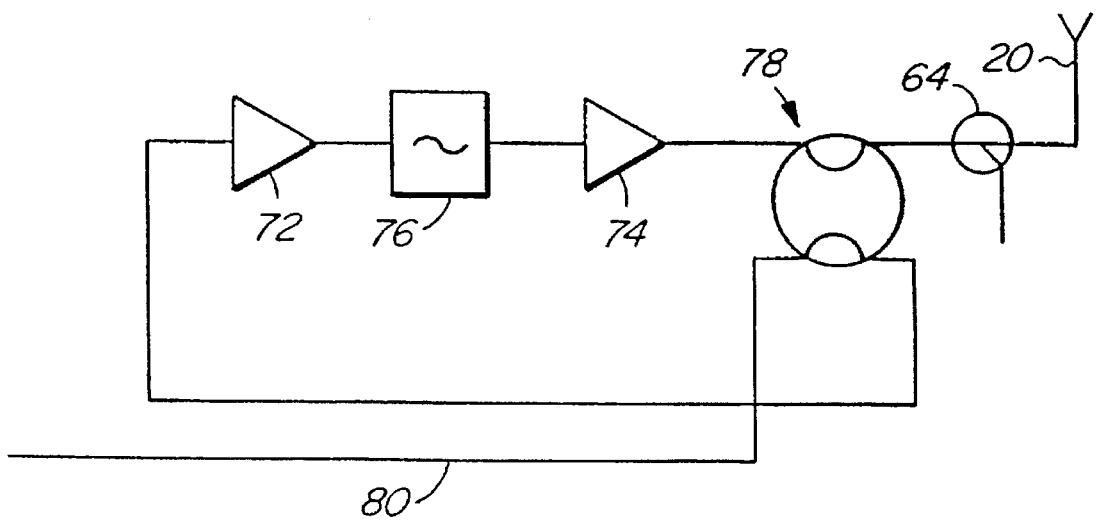

Reference is now made to FIGS. 4a and 4b, which show in greater detail the band limited time division duplex amplifier 62, which comprises a pair of amplifiers 72 and 74 connected in series, with a band limiting filter 76 connected between the amplifiers 72 and 74. The output of the amplifier 76 and the input of the amplifier 72 are connected to respective terminals of a transfer switch indicated generally by reference numeral 78. The antenna 20 and a conductor 80, extending from the variable attenuator 60, are connected to two other terminals of the transfer switch 78.

The transfer switch 78 has two switch states. As shown in FIG. 4A, in a first switch state, which is a "receive" state in which the receive signal from the handset 22 is being received by the antenna 20, the transfer switch 78 connects the antenna 20 to the input of the amplifier 72 and also connects the output of the amplifier 74 to the variable attenuator 60, so that the receive signal is amplified by the amplifiers 72 and 74 and the gain is controlled by the variable attenuator 60 so as to counteract attenuation between the antenna 20 and the base station 10.

In a second switch state of the transfer switch 78, as illustrated in FIG. 4B, the conductor 80 from the variable attenuator 60 is connected to the input of the amplifier 72, while the output of the amplifier 74 is connected to the antenna 20. In this "transmit" state, therefore, the transmit signal, after attenuation by the variable attenuator 60, is amplified by the amplifiers 72 and 74 to counteract signal loss between the base station and the antenna 20, as described above.

The changes in the state of the transfer switch 78 are controlled by control outputs from the microprocessor controller 72 in accordance with the timing derived from the transmit and receive signals.

Thus, the amplifiers 72 and 74 are used to amplify both the transmit signals and also the receive signals, and the transmit and receive signal gains are equal. The amplifier and switch arrangement shown in FIGS. 4A and 4B therefore enables the microcell extender 18 to automatically compensate for both the transmit signal loss from the base station 10 to the antenna 20 and, also, the receive signal loss from the antenna 20 to the base station 10.

Figure 5:
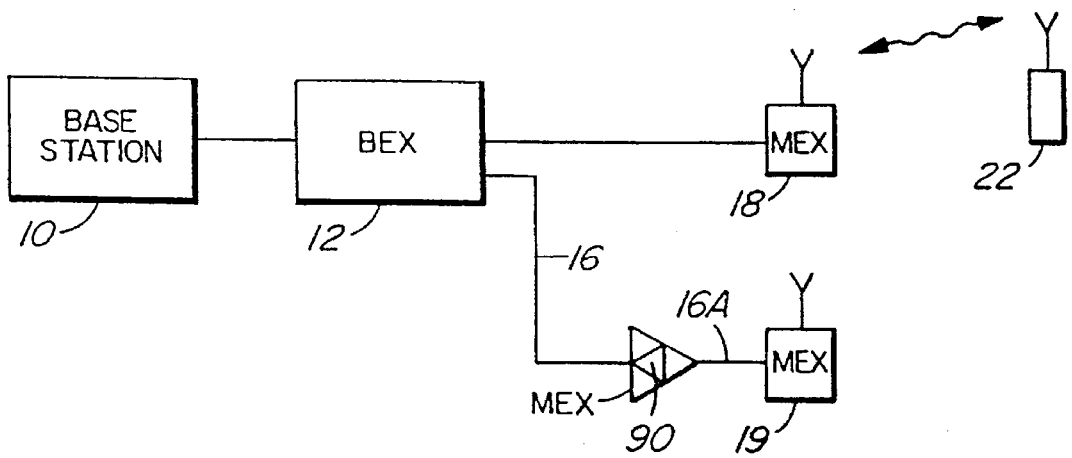
FIG. 5 shows a modification of the telephone system of FIG. 1.

FIG. 5 shows a modification of the telephone system illustrated in FIG. 1. More particularly, in the modification illustrated in FIG. 5, an in-line amplifier unit 90, which is similar to the microcell extenders 18 and 19, is connected between the base station extender 12 and the microcell extender 19 for amplifying the transmit and receive signals passing through the co-axial cable 16, and to relay the boosted signals to the microcell extender 19 or the base station extender 12, as the case may be.

The in-line amplifier unit 90 is similar to the microcell extender 18 shown in FIG. 3, except that, the antenna 20 is omitted and is replaced by a co-axial connector 91 for connection to a co-axial cable 16A extending to the microcell extender 19. This arrangement allows microcell extender 10 to be connected to the base station by a physically longer, and hence more lossy, length of co-axial cable.

As shown in FIG. 3, a bypass conductor 92 interconnects the co-axial connectors 52 and 91, i.e. the input and output of the in-line amplifier unit 90 and is provided with a switch 94. Closure of the switch 94 connects the 10.7 MHz subcarrier and the power from the connector 52 to the connector 91 and, thus, to the microcell 19.

When employing this in-line configuration, it is generally preferable to set the output level of the in-amplifier unit 90 lower than the usual transmit level. This allows the cascaded intermodulation budget for the in-line amplifier unit 90 and the end-of-line microcell extender 19 to be dominated solely by the end-of-line performance. Therefore, in operation, the closure of the switch 94 is detected by the microprocessor controller 72 and the variable attenuator 60 is adjusted by the microprocessor controller 72 in order to ensure that the detected signal level at connector 91 is, typically, one tenth of the signal output level at the base station 10. The in-line transmit gain will equal the in-line receive gain.

As described above, the transmit and receive signals are in the form of time division duplex signals. However, the above-described apparatus of FIGS. 1, 2 and 3 can be readily adapted for frequency division duplex operation.

Figure 6:
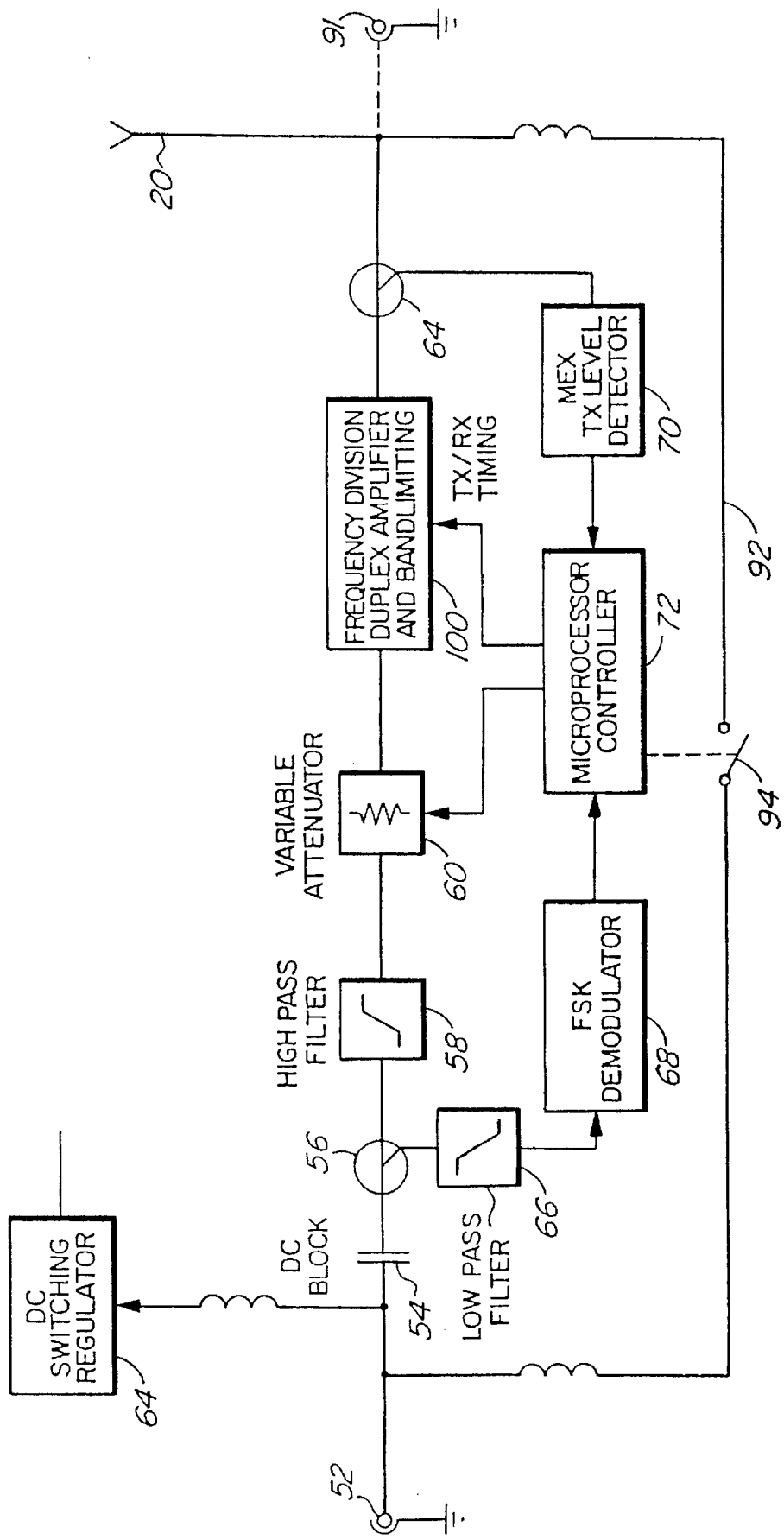
FIG. 6 shows a modification of the microcell extender of FIG. 3 for use in a frequency division duplex telephone system.

For this purpose, the band limited TDD amplifier 62 of FIG. 3 is replaced by a band limited FDD amplifier 100, as shown in FIG. 6. The remaining components of the microcell extender shown in FIG. 6 are similar to those of FIG. 3 and, therefore, have been referenced by the same reference numerals and will not again be described herein.

Figure 7:
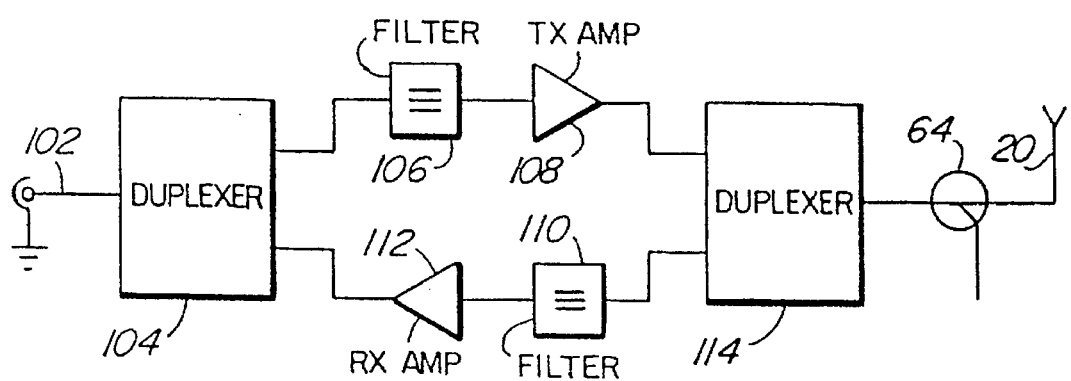
FIG. 7 shows a block diagram of an amplifier arrangement forming part of the microcell extender of FIG. 6.

The band limited FDD amplifier 100 of FIG. 6 is illustrated in greater detail in FIG. 7.

As shown in FIG. 7, a conductor 102, from the variable attenuator 60, is connected to a duplexer 104, which supplies the transmit signal through a band limiting filter 106 to a transmit amplifier 108, and which receives, from a band limiting filter 110 and a receive signal amplifier 112, the receive signal, which is then supplied through the conductor 102 to the variable attenuator 60.

The output of the transmit signal amplifier 108, and the filter 110 are connected to a further duplexer 114, which is connected through the directional coupler 68 to the antenna 20.

The duplexers 104 and 114 may, if required, be replaced by RF splitters/combiners.

In the FDD arrangement, the transmit amplifier 108 and filter 106 are physically distinct from the receive amplifier 112 and filter 110. Since the transmit signal levels are typically many orders of magnitude larger then the receive signal levels, the power detectors 42 (FIG. 2) and 70 (FIG. 3) can easily be used by the microprocessor 72 to distinguish the transmit power levels from the receive signal power levels. Provided that the receive amplifier 112 of FIG. 7 has a known gain relative to the transmit amplifier 108, the receive path gain between the antenna 20 and the base station 10 is again well controlled and determined by the signal level adjustment employed for the transmit signal gain.

The operation of the microprocessor 44 in FIG. 2 employs the following steps:

1. Measure the level from the detector 42.
2. If the level corresponds to a signal of more than (say), one-tenth of a milliWatt, assume the level represents a transmit pulse.
   If the level is smaller than one-tenth of a milliWatt, assume the level represents a receive pulse.
3. If a transmit pulse is present, send the level data to the FSK modulator 46 for transmission to all second part RF repeaters.
   If a receive pulse is present, send message "Rx Present" to all second RF repeater parts.
4. If a transmit pulse is present, but the previous measurement indicated a receive pulse, designate this measurement as the "start of the transmit pulse."
5. Send this "start of transmit pulse" data to the FSK modulator 46 for transmission to all second part RF repeaters.
6. Repeat the level measurement (i.e. return to step 1).

Given this sequence, the microprocessor 72 of FIG. 3 will typically operate as follows, for the concrete example of CT-2 Plus, which has 1 ms transmit and 1 ms receive epochs.

1. Read the data from the FSK demodulator 68.
2. If the data reads "start transmit pulse", start a software counter that will place the transfer switch 78 into the receive position, in 1 milliseconds time, and into the transmit position in 2 millisecond time.
3. If the data gives a transmit signal level, read the level of that instant from level detector 70.
4. If the switch 94 is closed (in-line mode), multiply the signal level recorded by the level detector 70 by ten.
   If the switch 94 is open (end-of-line mode) multiply the signal level recorded by the level detector 70 by one.

5. If the level from the level detector 70 is larger than the level read at the demodulator 68, increase the attenuation at the variable attenuator 60 by a small increment.

If the level from 70 is smaller than the level read at the demodulator 68, reduce the attenuation at the variable attenuator 60 by a small increment.

6. Repeat step 1 onwards.

Note that these software steps may result in the RF repeater being dysfunctional for two or three hundred milliseconds, when first powered up, but fully functional thereafter. In practice this is not a problem.

Of course, more sophisticated programs may be used, e.g.

the microprocessor in FIG. 3 may average the results of many measurements before deciding when the "start of transmit" really occurs, or what the transmit level really is.

as has been noted, CT-2 Plus provides a burst of CSC's in the absence of a voice link. The CSCs consist of three bursts of 1 millisecond each, every 72 milliseconds.

Under these circumstances, the microprocessor 72 of FIG. 2, performs the additional step of creating its own "start of transmit" pulse for step 2 if previous "start of transmit" pulses indicate it is now a transmit epoch, but the level data reads "Rx present", in contradiction to prior experience.

The operation of the microprocessors 72 and 44, has so far been described for TDD operation.

In fact similar software can be employed for FDD operation vis-a-vis level control, but the timing control software may be limited to assisting in FDD-TDMA systems to selecting certain time slots for broadcast/reception by certain array members.

Various modifications may be made in the above-described apparatus within the scope and spirit of the appended claims. For example, it may in some cases be useful to employ heterodyne techniques in the RF repeater arrangements of FIGS. 4 or 7. Also, instead of employing a variable attenuator and an amplifier to adjust the signal levels as described above, it may be appropriate in some circumstances to employ a variable gain amplifier for that purpose.

I claim:

1. An RF repeater arrangement for a broadcasting a transmit signal from a base station to a mobile handset and for supplying a receive signal from the handset to the base station in a wireless telephone system, said RF repeater arrangement comprising:

a first RF repeater part interfacing with said base station;

at least one second RF repeater part spaced from said first RF repeater part;

said second RF repeater part having an antenna for exchanging the transmit and receive signals with said handset as radio signals; and a signal conduit connecting said first RF repeater part to said second RF repeater part;

said first RF repeater part including a first level detector for detecting the signal level of the transmit 10 signal at said first RF repeater part, and a modulator for modulating the detected signal level as signal level data onto a carrier for transmission through said signal conduit to said second RF repeater part; and said second RF repeater part comprising a signal level regulator for amplifying the transmit signal, a second level detector for detecting the level of the transmit signal amplified by said signal level regulator, 15 a demodulator for demodulating the signal data from said first RF repeater part, a control device for comparing the demodulated signal level and the signal level detected by said second level detector to provide a control output to said signal level regulator, and an antenna for broadcasting the transmit signal to the handset; and said signal level regulator having a gain which is variable in accordance with said control output for 20 increasing the signal level detected by said second level detector in accordance with the level detected by the first level detector to thereby counteract attenuation of said transmit signal by said signal conduit.

2. An RF repeater arrangement as claimed in claim 1, wherein said signal level regulator comprises a transfer switch for alternately connect the transmit signal and the receive signal to said signal level regulator, whereby said transmit and receive signals are both amplified with equal gains.

3. An RF repeater arrangement as claimed in claim 1, wherein:

said first RF repeater part includes a processor for quantizing and encoding the output of said first level detector;

said processor including means for deriving the timing of the transmit signal and the receive signal from said first level detector;

said first RF repeater part further including a coupler for coupling transmit signal and the receive signal to said first level detector; and said coupler comprising a directional coupler adapted to couple said transmit signal preferentially to said first level detector to assist said processor in distinguishing said transmit signal from said receive signal.

4. An RF repeater arrangement as claimed in claim 3, wherein said control device comprises means for deriving timing from a control and signalling channel or a beacon signal from the base station in the absence of a basestation-mobile handset link.

5. An RF repeater arrangement as claimed in claim 3, wherein:

said signal level regulator comprises a transfer switch for alternately connecting the transmit signal and the receive signal to said signal level regulator in respective transmit and receive switch states, whereby said transmit and receive signals are both amplified with equal gains;

said control device comprising means for changing the switch state of said transfer switch in accordance with transmit and receive signal timing from said control device.

6. An RF repeater arrangement as claimed in claim 5, wherein said control device comprises means for deriving timing from a control and signalling channel or a beacon signal from said base station in the absence of the transmit signal.

7. An RF repeater arrangement as claimed in claim 1, further comprising an in-line amplifier unit connected by said signal conduit to the base station and to said second RF repeater part, said in-line amplifier unit comprising a further signal level regulator for amplifying the transmit signal, a further level detector for detecting the level of the transmit signal amplified by said further signal level regulator, a demodulator for demodulating the signal level data from said first RF repeater part, a further control device for comparing the demodulated signal level data and the signal level detected by said further level detector to provide a further control output to said further signal level regulator, and said further signal level regulator having a gain which is variable in accordance with the further control output for increasing the signal level detected by said further level detector in accordance with the level detected by said first level detector.

8. An RF repeater arrangement as claimed in claim 7, wherein said further signal level regulator comprises a transfer switch for alternately connecting the transmit signal and the receive signal to said further signal level regulator, whereby said transmit and receive signals are both amplified with equal gains.

9. An RF repeater arrangement as claimed in claim 7, wherein said in-line amplifier unit has an input, an output, a by-pass conductor path between said input and output and a switch in said by-pass conductor path for connecting power and a carder from said input to said output.

10. An RF repeater arrangement as claimed in claim 9, including directional couplers for connecting the transmit and receive signals to said first and second level detectors, said directional couplers being arranged to effect preferential coupling of the transmit signal to said first and second level detectors to assist said first and second microprocessor controllers in distinguishing the transmit signal from the receive signal for deriving timing information from the transmit signal.

11. An RF repeater arrangement for exchanging time division duplex transmit and receive signals between a handset and a base station in a wireless telephone system, said RF repeater arrangement comprising:

a first RF repeater connected to said base station;

a second RF repeater part for amplifying the transmit and receive signals;

the second RF repeater part having an antenna for exchanging the transmit and receive signals with said handset as radio signals; and a signal conduit connecting said first RF repeater part to said second RF repeater part;

said first RF repeater part including a first signal level detector for detecting the level of the transmit signal at said first RF repeater part, a first microprocessor controller for quantizing and encoding signal level data representing the signal level detected by said first signal level detector and a modulator for modulating the signal level data and outputting the modulated signal level data through said signal conduit to said second RF repeater part; and said second RF repeater part comprising a demodulator for demodulating the signal level data, an amplifier for amplifying the transmit and receive signals, a second signal level detector for detecting the level of said transmit signal amplified by said amplifier and the level of said receive signal from said antenna, a variable attenuator connected between said signal conduit and said amplifier and a second microprocessor controller for comparing the demodulated signal level data and the transmit signal level detected by said second signal level detector and correspondingly adjusting said attenuator to counteract attenuation of said transmit and receive signals along said signal conduit, said second microprocessor controller being connected to said amplifier for providing thereto timing derived from said transmit and receive signals.

12. An RF repeater arrangement as claimed in claim 11, wherein said amplifier has an input, an output and a transfer switch controlled by the timing from said second microprocessor controller for alternately connecting said output to said antenna, for broadcasting the amplified transmit signal, and said antenna to said input, for amplifying the receive signal, so that the transmit signal and the receive signal are similarly amplified.

* * * * *